United States Patent [19]

Friedman et al.

[11] Patent Number: 5,604,174

[45] Date of Patent: Feb. 18, 1997

[54] METAL FOIL CATALYST MEMBERS BY AQUEOUS ELECTROPHORETIC DEPOSITION

[75] Inventors: Semyon D. Friedman, Baltimore; Awdhoot V. Kerkar, Columbia, both of Md.; Ernest W. Hughes, Erie, Pa.; Rasto Brezny, Catonsville, Md.; John W. Lau, Gaithersburg, Md.; Jacob Block, Rockville, Md.

[73] Assignee: W. R. Grace & Co.-Conn., New York, N.Y.

[21] Appl. No.: 460,783

[22] Filed: Aug. 30, 1995

Related U.S. Application Data

[63] Continuation of Ser. No. 276,126, Jul. 15, 1994, which is a continuation of Ser. No. 247,436, May 23, 1994, abandoned.

[51] Int. Cl.$^6$ .................................................. B01J 21/04
[52] U.S. Cl. ....................... 502/439; 502/303; 502/304; 502/349; 502/355; 423/213.2
[58] Field of Search ............................. 502/303, 304, 502/349, 355, 439; 423/213.2

[56] References Cited

U.S. PATENT DOCUMENTS

| | | | |
|---|---|---|---|
| 2,966,449 | 12/1960 | Bouchard et al. | 204/181 |
| 3,219,730 | 12/1965 | Bliton et al. | 264/5 |
| 3,787,305 | 1/1974 | Ballard | 204/181 |
| 3,923,696 | 12/1975 | Chart et al. | 252/467 |
| 3,947,340 | 3/1976 | Kawagoshi et al. | 204/181 |
| 4,279,782 | 7/1981 | Chapman et al. | 252/465 |
| 4,288,346 | 9/1981 | Hunter et al. | 252/437 |
| 4,329,403 | 5/1982 | Baker | 429/35 |
| 4,363,753 | 12/1982 | Bozon et al. | 252/477 R |
| 4,466,871 | 8/1984 | Kaup et al. | 204/181 N |
| 4,467,050 | 8/1984 | Patel et al. | 502/330 |
| 4,567,117 | 1/1986 | Patel et al. | 429/19 |
| 4,601,999 | 7/1986 | Retallick et al. | 502/314 |
| 4,634,502 | 1/1987 | Callahan et al. | 204/23 |
| 4,673,663 | 6/1987 | Magnier | 502/320 |
| 4,711,009 | 12/1987 | Cornelison et al. | 29/157 R |
| 4,771,029 | 9/1988 | Pereira et al. | 502/355 |
| 4,838,067 | 6/1989 | Cornelison | 72/196 |
| 5,080,882 | 1/1992 | Yoshimoto et al. | 423/579 |
| 5,081,095 | 1/1992 | Bedford et al. | 502/304 |
| 5,158,654 | 10/1992 | Yoshimoto et al. | 204/59 R |
| 5,211,822 | 5/1993 | Abry | 204/180.7 |
| 5,232,671 | 8/1993 | Brunson et al. | 422/174 |
| 5,272,125 | 12/1993 | Weible et al. | 502/242 |
| 5,272,876 | 12/1993 | Sheller | 60/300 |

FOREIGN PATENT DOCUMENTS

| | | |
|---|---|---|
| 104903 | 4/1984 | European Pat. Off. . |
| 107352 | 5/1984 | European Pat. Off. . |
| 0390321 | 10/1990 | European Pat. Off. . |
| 2-78443 | 3/1990 | Japan . |
| 278443 | 3/1990 | Japan . |
| 4183898 | 6/1992 | Japan . |

OTHER PUBLICATIONS

P. Nass et al, "Electrophoretic Deposition of Alumina from Non-Aqueous Dispersions", date unknown.

J. Y. Choudary et al, "Electrophoretic Deposition of Alumina for Aqueous Suspensions," Trans. J. Br. Ceram. Soc., 81, 193–196 (1982) (month unknown).

S. N. Heavens, "Electrophoretic Deposition as a Processing Route for Ceramics," J. Ad. Ceram. Pro. Tech., pp. 255–283 (date unknown).

*Primary Examiner*—Shrive Beck
*Assistant Examiner*—Timothy H. Meeks
*Attorney, Agent, or Firm*—Beverly J. Artale

[57] ABSTRACT

Flexible metal foil catalyst members suitable for use in catalytic devices for combustion engine emission control are prepared by electrophoretic deposition using an aqueous slurry of catalyst support particles. The deposited support layer is of uniform thickness and stable surface area. The catalyst support may then be impregnated with catalytic species and assembled into a catalytic device. The catalyst members from the invention are especially suitable for use in automotive applications, and more especially in electrically heated catalytic devices.

18 Claims, 2 Drawing Sheets

METAL FOIL CATALYST MEMBERS BY AQUEOUS ELECTROPHORETIC DEPOSITION

This is a continuation of application Ser. No. 08/276,126, filed Jul. 15, 1994, which is a continuation of application Ser. No. 08/247,436, filed May 23, 1994, now abandoned.

BACKGROUND OF THE INVENTION

The use of catalytic converters to reduce the amount of atmospheric pollution resulting from combustion engines and industrial operations has increased rapidly in the last 25 years. Catalytic converters can be found in a multitude of varieties depending on the end use of the converter, the cost structure of the particular market, the availability of materials and fabrication techniques, etc.

Many converter designs employ catalyst members either as monoliths or as a plurality of separate members. These catalyst members generally contain one or more catalytically active species located on and/or in a porous catalyst support material. The catalyst support material itself usually is in the form of a coating which has been applied to either a metal or ceramic substrate. Substrates are generally shaped in a fashion to maximize the available surface area for catalytic reaction while maintaining adequate mechanical properties. Catalyst members (especially metal members) are often corrugated in order to increase the available surface area provided. In other instances, the members may be in the form of honeycombs or other reticulated shapes.

In recent years, there has been a strong interest in improved converters for mobile internal combustion engine applications (especially for automobiles) to address the ineffectiveness of present day converters when the converter is cold (e.g., during the minutes immediately following engine startup). Many of these designs use thin metal foil members as substrates for catalyst members. Thin foils are preferred, in part, because they allow more surface area for catalytic activity per unit volume. Some of these improved converter designs also involve the use of electrical heating elements in close proximity to catalyst support-coated metal foil catalyst members. In these electrically heated designs, the catalyst support material may also act as an insulator to protect against short circuiting between the various metal foil members in the converter. Effective thin metal foil catalyst members are essential to the fabrication and performance of many of these "next generation" designs.

As noted in U.S. Pat. No. 5,272,876, catalytic exhaust device for automotive applications must be able to survive both rigorous quality Control test and severe operating conditions. These conditions often involve exposure to temperatures on the order of 800°–950° C. Effective catalyst supports must be able to retain their surface area/porosity characteristics even on exposure to these high temperature conditions.

In conventional industry practice, catalyst support materials are most often applied by a washcoat technique where the substrate is dipped into a slurry which contains particles of the support material. The substrate is then removed from the slurry and the slurry coating on substrate is dried and/or calcined. Usually, the dipping process must be repeated in order to build up a sufficient catalyst support layer. Once an adequate support layer has been formed on the substrate, the catalytically active species (typically precious metals) would then be placed (often by impregnation using a precious metal-containing slurry) on and/or in the support layer.

The catalyst support layer should have a high amount of available surface area while being coherent and adherent to the substrate. Porosity characteristics are of importance in terms of the overall efficiency of the converter employing the catalyst member. Cohesion of the catalyst support material is also important where the catalyst member is to be exposed to gas flows, thermal shock, etc. over the service life of the engine.

For thin metal foil substrates, adhesion is especially important since the metal foil substrate is generally much more flexible than the catalyst support coating. Poor adhesion characteristics can result in delamination of the catalyst support layer from the foil during handling, assembly, or use. For mass market applications such as the automotive industry, even infrequent delamination can become an intolerable problem in terms of quality control and performance reliability.

While dipping is a widely practiced coating technique, the results it provides are often less than ideal. Due (at least in part) to surface tension of the slurry, the washcoat slurry applied by dipping preferentially collects in negative radius of curvature areas of the substrate. This preferential collection results in a catalyst support layer of non-uniform thickness on the substrate. The problem of non-uniform support layer thickness is accentuated where the catalyst member has regions with widely differing radii of curvature (e.g. a corrugated member). In such instances, the slurry will collect in any areas having negative radius of curvature (valleys or crevices) of the substrate. Non-uniformity of thickness can result in non-optimal use of the available surface area in the catalyst member, waste of precious metals in areas of excessive coating thickness, restriction of gas flow past the catalyst member in the converter, etc. Non-uniform coatings are also prone to delamination from the metal substrate by cracking or chipping.

Various efforts have been made to improve the results obtained by dipping. Often, expensive auxiliary ingredients are added to the slurry to improve its ability to coat the substrate. In some instances, the substrates themselves have been pretreated to make them more amenable to coating. These efforts have not been successful in overcoming the problem of non-uniform support thickness.

In the search for alternatives to dipping, some attempts have been made to use electrophoretic deposition to deposit catalyst support materials on metal substrates. To date, however, it is not believed that electrophoretic deposition has been used to produce a commercially viable catalyst support having acceptable characteristics (e.g. porosity, cohesion, adhesion, etc.) on a flexible metal substrate suitable for use in automotive exhaust applications. Thus, there remains a need for catalyst members having more uniform thickness of support material on a flexible metal substrate wherein the catalyst support has acceptable physical characteristics. A need also remains for improved and alternative processes to make catalyst members using metal substrates. These needs are especially acute for automotive applications.

SUMMARY OF THE INVENTION

The invention provides catalyst members having a suitably porous and adherent catalyst support coating of substantially uniform thickness on a flexible metal substrate. The invention further provides processes using aqueous electrophoretic deposition to form catalyst support layers on metal substrate surfaces.

In one aspect, the invention encompasses a catalyst support member comprising (1) a metal foil substrate having first and second primary surfaces and an edge surface, and (2) a porous ceramic oxide catalyst support layer on at least the first primary surface, the support layer being of substantially uniform thickness and having (i) a surface area of about 100–300 $m^2/g$ based on the weight of the ceramic oxide, (ii) pore volume of about 0.3–1.0 cc/g, typically 0.5–1.0 cc/g, and (iii) a thickness of about 50–60 μm, typically about 20–50 μm.

The catalyst support member may further comprise a thin oxide base layer between the metal foil surface and the catalyst support layer. The invention further encompasses catalyst members wherein catalytically active species are placed on and/or in the catalyst support members of the invention.

In another aspect, the invention encompasses a method of forming a catalyst support member, the catalyst support member comprising (1) a metal foil substrate having first and second primary surfaces and an edge surface, and (2) a porous ceramic oxide catalyst support layer on the first primary surface, the method comprising:
(a) contacting the metal foil with an aqueous slurry of particles of the ceramic oxide catalyst support whereby at least a portion of the first primary surface is in contact with the slurry, the slurry pH being such that particles have a positive surface charge,
(b) placing an electrode in contact with the slurry,
(c) applying an electric field between the foil and the electrode whereby the foil becomes a cathode and the electrode becomes an anode,
(d) maintaining the electric field for a time sufficient to cause deposition of at least some of the particles on the first primary surface thereby forming a coated foil,
(e) removing the coated foil from the electric field and from contact with the slurry, and
(f) drying the coated foil. The invention also encompasses methods for making catalyst members wherein catalytically active species are placed on or in the catalyst support member made by steps (a)–(f) above. The methods of the invention may be conducted as batch or continuous operations. These and other aspects of the invention will be described in further detail below.

DETAILED DESCRIPTION OF THE INVENTION

The catalyst support members and catalyst members of the invention contain suitably porous and adherent catalyst support coating of substantially uniform thickness on a metal foil substrate. The catalyst support layer is situated on the metal foil substrate either directly or with an intervening thin oxide coating.

Figure 1:
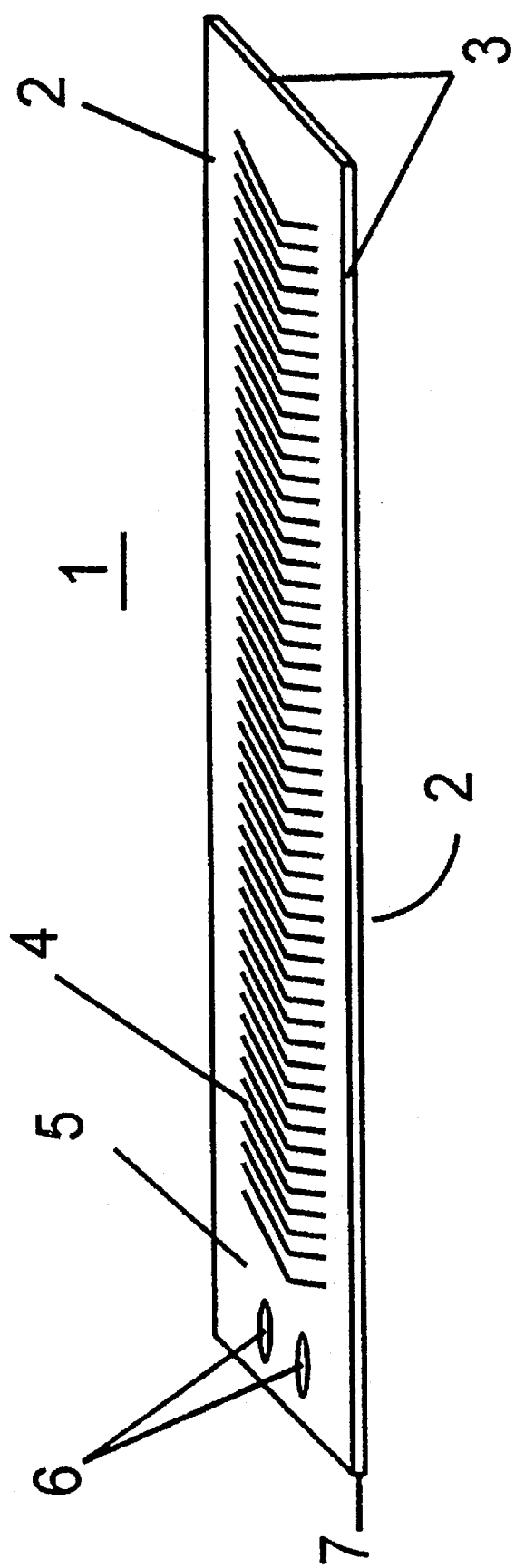
FIG. 1 shows a conceptual view of a corrugated metal foil substrate with the foil thickness exaggerated for ease of illustration.

Referring to FIG. 1, the metal foil substrate 1 has primary surfaces 2 and edge surface 3. The foil may also have corrugations 4 on some or all regions. Corrugations are typically employed as a means of increasing the available surface area for catalytic activity, to alter the gas flow through the converter, etc. In many instances, it may also be desirable to have non-corrugated regions 5 for purposes such as brazing, electrical contact or mechanical attachment. If desired, the foil may also contain perforations 6 which may be useful in handling the foil during processing as well as for alignment and assembly in the converter device. The invention is not limited to any specific foil design or shape. If desired, the foil may be treated as a continuous length of foil which is subsequently cut into individual foil substrates (or catalyst members) at a desired stage in the overall process of manufacture.

The metal foil substrate's dimensions will generally be dictated by converter design considerations, commercial availability of metal stock, etc. Typical foils are described in U.S. Pat Nos. 5,272,876, 4838,067, 4601,999, and 4,414,023. Foil thickness 7 for most catalytic converter designs ranges from 0.02–0.25 mm. Thinner foils are generally preferred since they can provide increased available surface area per unit volume. The primary surface dimensions of the foil are also largely dependent on design considerations, handling considerations, etc.

While the invention is not limited to specific metal foil compositions, ferritic or nickel alloys are generally preferred. Preferably, the metal foil composition contains at least a minor amount of a metal which, when oxidized will act to facilitate adherence of the catalyst support material to be deposited. Thus, for alumina-containing catalyst support materials, metal foil compositions which contain aluminum are preferred. Typical foil compositions often contain combinations of aluminum, chromium, nickel and/or iron with minor amounts of other elements.

Figure 2:
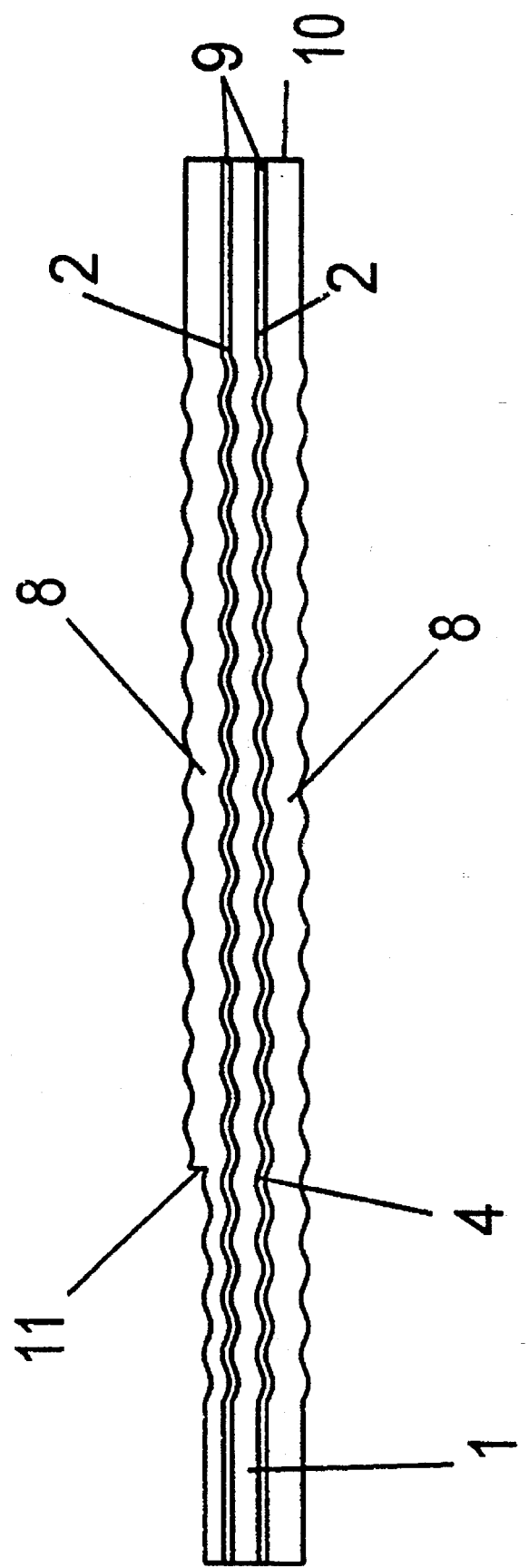
FIG. 2 shows a cross sectional view of corrugated metal foil of FIG. 1 coated according to the invention.

Referring to FIG. 2, the catalyst support layer 8 may be in direct contact with the metal foil primary surface 2. Preferably, however, the catalyst support layer 8 is in direct contact with a thin oxide film 9 which directly contacts the metal foil primary surface 2. The catalyst support layer 8 may cover the entire surface of the metal foil or may cover only selected regions of the foil. If desired, the catalyst support layer 8 may cover one primary surface or both primary surfaces. Preferably, the corrugated regions 4 are entirely covered with the catalyst support layer 8. It is also preferred that some or all of the edge surface 3 be covered by the catalyst support layer 8. The catalyst support layer 8 may be present as a continuous layer or may be interrupted such that exposed regions of the metal foil are surrounded by continuous regions which are covered by the catalyst support layer 8.

The catalyst support layer 8 preferably has substantially uniform thickness 10 in all regions where it is present on the metal foil substrate 1. In some instances, it may be possible to have the support layer exist in different discrete thicknesses such that step-like differences 11 in thickness would exist. By use of electrophoretic deposition, as discussed below, it is possible to limit the variation in support thickness such that there is less than about 10% (more preferably about 5% or less) difference in thickness (measured as the greatest support thickness divided by the smallest support thickness) across the entire catalyst support layer 8 (except for possible step-wise differences.)

The catalyst support layer 8 preferably has (i) a surface area of about 100–300 $m^2/g$ based on the weight of the ceramic oxide contained therein, more preferably about 0.3–1.0 cc/g, preferably about 150–250 $m^2/g$, (ii) pore volume of about 0.5–1.0 cc/g and more preferably about 0.70–0.80 cc/g, and (iii) a thickness of about 15–60 μm, preferably about 20–50 μin, and more preferably about 25–40 μm. The coherence of the deposited particles is preferably such that the coating is not chalky. The adhesive strength of the support layer is preferably such that the substrate can be flexed during normal processing and use without delamination of the support layer.

The support layer material preferably comprises one or more ceramic oxides. The ceramic oxide is preferably selected from the group consisting of alumina, ceria, baria, titania, zirconia, lanthanum oxide, other rare earth oxides, and mixtures thereof. The support layer may be designed to contain variations of composition and/or porosity through the thickness of the layer. Preferably, the loading of support on the substrate is about 10–80 mg/in$^2$ of coated surface, more preferably about 15–50 mg/in$^2$.

If present, a thin oxide film may cover all or portions of the metal substrate surface. The film preferably intervenes between the metal substrate and the catalyst support layer over the entire area of the catalyst support layer. There may be instances in which portions of the substrate are covered by the catalyst support layer, but not the thin film layer. There may also be instances where the thin film exists on portions of the metal substrate without any coverage by the catalyst support layer.

The thin film layer preferably has a thickness of about 50–5,000 Å more preferably about 100–2000 Å. Preferably, the thickness of thin film layer is substantially uniform. The thin oxide film composition preferably contains a metal oxide which is also present in the catalyst support material to be deposited or which facilitates adherence of the catalyst support material to the substrate. Thus, for alumina-containing catalyst support materials, the thin film compositions preferably contain alumina. The thin oxide film is preferably formed by oxidation of the underlying metal foil. In such cases, the film will contain oxides of the metals in the foil. The ratio of molar metal oxides in the foil may vary from the molar ratio of the corresponding metals in the oxide film due to differences in diffusion rates of the various metals.

For the catalyst member itself, catalytically active species would be located on and/or in the support layer. The catalytically active species may be any known species or combination thereof. Typically, precious metals such as platinum, palladium and/or rhodium are used. The loading of catalyst is preferably at levels conventionally used in the art (e.g. 20–200 g/ft$^3$). In some instances, due to the uniformity of the support layer thickness, it may be possible to use less catalyst for the same effective activity level as would be achieved using other support layers.

The invention encompasses methods which can be used to form the catalyst support members and actual catalyst members described above. The methods of the invention preferably include at least the following steps:
(a) contacting the metal foil with an aqueous slurry of particles of the ceramic oxide catalyst support whereby at least a portion of the first primary surface is in contact with the slurry, the slurry pH being such that the particles have a positive surface charge,
(b) placing an electrode in contact with the slurry,
(c) applying an electric field between the foil and the electrode whereby the foil becomes a cathode and the electrode becomes an anode,
(d) maintaining the electric field for a time sufficient to cause deposition of at least some of the particles on the first primary surface thereby forming a coated foil,
(e) removing the coated foil from the electric field and from contact with the slurry, and
(f) drying the coated foil.

Metal foils typically come from the supplier in wound rolls. Depending on the method of foil manufacture, the foil may have residual stresses associated with the working of the metal. Metal foil stock also may contain an extremely thin surface oxide coating (i.e.<30 Å). If desired, the foil may be treated with an initial annealing step such as that disclosed in U.S. Pat. No. 4,711,009 in order to lessen the amount of residual stress. If the foil is to be corrugated, the corrugating would typically follow the annealing (if done). Corrugation may be performed by any suitable method known in the art to form whatever corrugation pattern is desired. The foil is then preferably treated to remove any lubricant (associated with the corrugation process) and is annealed to remove stresses from the corrugation step. The lubricant may be removed by washing with an appropriate solvent or detergent. More preferably, however, the lubricant is burned off in the initial stages of the subsequent annealing step.

While the process of the invention can be practiced with an untreated foil, preferably the foil is pretreated at some point before the electrophoretic deposition step to enhance the adherence of the subsequently deposited catalyst support layer. While abrasion of the surface has been disclosed in the prior art as enhancing adhesion, a preferred pretreatment is to grow a thin oxide film on the foil surface by firing the foil in a mildly oxidizing atmosphere for a brief period of time.

The oxidizing treatment is preferably carried out at about 800°–950° C. (more preferably about 875°–925° C.) in an atmosphere having an oxygen partial pressure of about 0.1–0.3 atm (preferably about 0.2 atm) for about 0.5–3 minutes (preferably about 1–2 min.). If desired, the milder or more severe oxidizing environments can be used with appropriate changes in firing time. The oxide film thickness is preferably about 50–5000 Å, more preferably about 100–2000 Å. The oxide film grows by oxidation of metals in the metal foil as they diffuse to the surface. Depending on the oxidizing conditions, the actual oxide composition of the film may differ from the metal foil bulk significantly in terms of the proportions of the various metals in the oxides as compared with the actual foil composition. Thus, for example, where aluminum is present in the foil in a minor proportion, aluminum oxide may nevertheless form the bulk of the oxide film since aluminum has a comparatively high diffusion rate. While the mechanism by which the film improves adhesion has not been fully understood, it appears that the adhesion improvement is greatest when the oxide film contains, at its outermost surface, a predominant amount of an oxide which is also used in the catalyst support layer. Preferably, the thin oxide film is of substantially uniform thickness over the entire surface of the metal substrate.

If it is desired to avoid deposition of the catalyst support layer on certain portions of the metal foil substrate, those portions of the foil may be precoated with a water-insoluble organic masking material. The masking material is preferably applied as a liquid which solidifies prior to contact of the foil with the deposition slurry. The masking is removed at an appropriate time in the process subsequent to the catalyst support deposition.

The metal foil (with or without any of the pretreatments described above) is then placed in contact with an aqueous deposition slurry which contains the catalyst support particles to be deposited. The contacting may be performed by simply immersing the foil substrate into a bath of the slurry. Alternatively, the metal foil may be passed through a flow of the slurry. The latter method is especially suitable where the metal foil is in a continuous length form containing a multitude of metal foil substrates which are later severed into individual members. An electrode is also placed in contact with the slurry. Electrical contact is made with the metal foil substrate such that the foil becomes a cathode. An electric field is then applied across the electrodes and through the slurry. The applied electric field causes catalyst support particles in the slurry to deposit on the metal foil.

The deposition conditions are preferably selected so as to deposit the desired amount of catalyst support in a very short period of time. The total deposition time is preferably 30 seconds or less, more preferably 10 seconds or less. The use of extremely short deposition times has been found to enhance the adhesion strength and coherence of the deposit while minimizing disruptive effects associated with electrolysis of water at the foil surface. Surprisingly, it has been found that the use of high deposition current density actually acts to minimize the adverse effects of electrolysis while producing a deposit having good porosity, adhesion and cohesion properties.

The deposition is preferably carried out at constant current density where a batch deposition process is employed or at constant voltage where a continuous length of foil is passed through a deposition bath. It is possible to vary both voltage and current density if desired. In general, it is preferred to use either constant current or constant voltage so the amount of deposition can be controlled by control of the deposition time. Since the effective resistivity of the deposition electrode increases with the amount of deposit, a constant current density mode would require increasing voltage over the time of deposition. Correspondingly, if the voltage is held constant, the current density would decrease with the time of deposition.

The current density preferably ranges from about 0.1–5 amp/in$^2$, more preferably about 0.3–3 amp/in$^2$. The applied voltage necessary to achieve this current density will depend on the resistivity of the deposition bath, the resistivity of the deposition electrode, the mobility and charge of the particles, etc. Typically, the applied voltage is about 0.1–70 volts depending on these various factors. The deposition rate is preferably such that about 5–50 mg/in$^2$ (more preferably about 15–40 mg/in$^2$) is deposited. Preferably, the total deposition is accomplished in about 5 seconds or less deposition time. The deposition may be accomplished in a single run or may be accomplished in several shorter runs.

Preferably, the particles in the slurry (other than those actually being deposited) are maintained in a dispersed state throughout the deposition by agitation of some sort.

The actual slurry compositions used in the invention preferably contain the catalyst support particles, deionized water, and a pH adjusting agent. The support particles may include aluminum hydroxide colloidal particles which are believed to improve the coherence of catalyst support particles. The pH is adjusted so as to ensure the desired polarity of surface charge on the support particles. The pH is preferably adjusted by addition of a mineral acid such as nitric acid. For deposition of materials such as alumina on the cathode, the pH is preferably about 2–4 more preferably about 2.5–3.5. Solids content of the slurry is also preferably kept at about 15–40 wt. %. High solids content tends to minimize any adverse effects associated with electrolysis.

After the desired deposit has been achieved, the coated foil is removed from the bath. Excess slurry is removed from the foil to avoid segregation of residual slurry which clings to the foil. The removal of excess slurry may be performed by using air knives, a rinsing bath or other known means. The foil is then dried. Preferably, the foil is also calcined before subsequent impregnation with precious metals. If desired, multiple depositions may be performed on the same foil either by running the foil through the same slurry or a different slurry. If multiple depositions are desired, the foil is preferably dried between depositions. The drying and calcining conditions used may be any conventional conditions such as those disclosed in U.S. Pat. No. 4,711,009 whose disclosure is incorporated herein by reference.

If any masking has been applied to the foil, the masking is preferably removed by oxidation during the calcination.

The catalyst support member resulting from this process may be further treated to place catalysts on the member by impregnation or other known technique. See U.S. Pat. No. 4,711,009 for example. If the foil has been treated as a continuous length, it may be severed at this point in the process.

The resulting catalyst members can then be assembled into a desired converter design.

The invention is further illustrated by the following examples. It should be understood that the invention is not limited to the specific details of the examples.

EXAMPLE 1

A 33 wt. % solids slurry was formed by combining 92.5 parts by weight (pbw) gamma alumina particles, 7.5 pbw alumina monohydrate and deionized water. The pH of the slurry was adjusted to about 3.0 by addition of nitric acid. The slurry was then placed in an agitated deposition bath.

A continuous aluminum-chromium-iron alloy foil strip (Alpha IV sold by Allegheny Ludlum Corp.) was treated at 900° C. and 0.2 atm oxygen for one minute to form thin oxide film on both sides of the foil. The foil was then passed through the deposition bath and an electrical field was applied such that the foil was made to be a cathode with the other electrodes (already in contact with the deposition bath) as anodes. The effective length of foil cathode in the deposition bath was about one foot. The foil was passed through the bath at a line speed of 10 ft./min. The deposition was performed at a constant voltage of about 15 volts at cathode-anode separation of 3 inches. The average current density over the foil was about 0.27–0.30 amp/in$^2$. The foil with resulting deposit was rinsed in deionized water and excess liquid was removed using air knives. The resulting support-coated foil was dried and calcined at 925° C. for 30 seconds. The resulting foil was impregnated with a platinum/rhodium catalyst mixture and calcined to produce a catalyst member.

EXAMPLE 2

A 28% solids slurry was formed by combining 68 pbw gamma alumina particles, 25 pbw ceria particles, 7 pbw alumina monohydrate, and deionized water. The pH was adjusted to 3.5 by addition of nitric acid.

Strips of the foil of example 1 having the thin film oxide of example 1 (1.6"×4.9") were immersed in an agitated deposition bath of the slurry. An electrical field was applied such that the foil was made to be the cathode. The deposition was carried out for 5 seconds at a current density of about 1.0 amp/in$^2$. The coated foil was then removed from the bath, rinsed and dried. The foil was then calcined under the conditions of example 1.

What is claimed is:

1. A method for forming a catalyst member, said member comprising (1) a metal foil having first and second primary surfaces and an edge surface, at least a portion of said first and second primary surfaces being corrugated and (2) a porous ceramic oxide catalyst support layer on said first primary surface and on the corrugated portion thereof, said method comprising:

(a) contacting at least said portion of a metal foil which is corrugated with an aqueous slurry comprised of particles of a porous ceramic oxide whereby at least a portion of said first primary surface is in contact with said slurry, (b) placing an electrode in contact with said slurry, (c) applying an electric field between said foil and said electrode whereby an electrical potential is created on the foil which potential is opposite to an electrical potential on the particles in the slurry, (d) maintaining said electric field for a time sufficient to cause deposition of at least some of said particles on at least said first primary surface, including at least a portion of said primary surface which is corrugated, thereby coating the foil and forming a catalyst support layer thereon;

(e) removing said coated foil from said electric field and from contact with said slurry, (f) contacting the coated foil with a pressurized air flow to remove excess slurry, (g) drying said coated foil to form a catalyst support layer on the foil, (h) optionally impregnating said catalyst support layer with a catalytic species, and (i) optionally calcining said impregnated foil, thereby forming a catalyst member.

2. The method of claim 1 wherein at least a portion of said primary surface of said foil is pretreated by abrasion or oxidation prior to adhering said deposited particles.

3. The method of claim 2 wherein said pretreatment comprises contacting said foil with an oxidizing atmosphere whereby a metal oxide film is formed on said foil surface.

4. The method of claim 2 wherein said pretreatment comprises heating said foil to about 800°–950° C. for about 0.5–3 min. in an atmosphere having an oxygen partial pressure of 0.1–0.3 atm.

5. The method of claim 1 wherein said contacting step (a) comprises immersing said foil in said slurry.

6. The method of claim 1 wherein, prior to said contacting step (a), at least a portion of said first primary surface is coated with a masking layer adapted to prevent adherence of electrophoretically deposited particles on said masked portion.

7. The method of claim 6 wherein said masking is removed after step (d) to yield a brazable surface portion on said foil.

8. The method of claim 1 wherein said slurry is agitated during step (d).

9. The method of claim 1 wherein said contacting step (a) comprises passing said foil through said slurry in a direction.

10. The method of claim 9 wherein said slurry is flowed countercurrent to the direction of foil passage.

11. The method of claim 9 wherein said foil is in the form of a continuous ribbon which is cut into individual members after said deposition.

12. A method of making a catalyst body in a continuous manner which comprises the steps of:

a. corrugating at least a portion of a metal foil having first and second primary surfaces and an edge surface;

b. contacting at least said portion of metal foil which is corrugated with an aqueous slurry comprising particles of a porous ceramic oxide, whereby at least a portion of said first primary surface is in contact with said slurry;

c. placing an electrode in contact with said slurry;

d. applying an electric field between said foil and said electrode whereby an electrical potential is created on the foil which potential is opposite to an electrical potential on the particles in the slurry;

e. maintaining said electric field for a time sufficient to cause deposition of at least some of said ceramic oxide particles on at least said first primary surface, including at least a portion of said primary surface which is corrugated, thereby coating the foil and forming a ceramic-oxide catalyst support layer thereon;

f. removing said coated foil from said electrical field and from contact with said slurry;

g. contacting the coated foil with a pressurized air flow to remove excess slurry, h. drying said coated foil to form a catalyst support layer on the foil;

i. optionally, impregnating said catalyst support layer with a catalytic species; and j. optionally calcining said coated foil to form a catalyst body.

13. The method of claim 12 which further comprises the step of:

k. severing a predetermined length of said calcined impregnated foil to form a catalyst body.

14. A method of forming a catalyst body from a continuous metal foil strip comprising:

a. corrugating at least a portion of a continuous metal foil strip having first and second primary surfaces and an edge surface;

b. contacting at least said portion of metal foil which is corrugated with an aqueous slurry comprising particles of a porous ceramic oxide, whereby at least a portion of said first primary surface is in contact with said slurry;

c. placing an electrode in contact with said slurry;

d. applying an electric field between said foil and said electrode whereby an electrical potential is created on the foil which potential is opposite to an electrical potential on the particles in the slurry, e. maintaining said electric field for a time sufficient to cause deposition of at least some of said ceramic oxide particles on at least said first primary surface, including at least a portion of said primary surface which is corrugated, thereby coating the foil and forming a ceramic-oxide catalyst support layer thereon;

f. removing said coated foil from said electrical field and from contact with said slurry;

g. contacting the coated foil with a pressurized air flow to remove excess slurry;

h. drying said coated foil to form a catalyst support layer on the foil;

i. optionally impregnating said catalyst support layer on the dried coated foil with a catalyst species; and j. optionally, calcining said coated foil to form a catalyst body.

15. The method of claim 14 which further comprises the step of:

k. severing a predetermined length of said calcined impregnated foil to form a catalyst body.

16. The method of claim 1 wherein said electric field is applied whereby the foil becomes a cathode and the electrode becomes an anode.

17. The method of claim 12 wherein said electric field is applied whereby the foil becomes a cathode and the electrode becomes an anode.

18. The method of claim 14 wherein said electric field is applied whereby the foil becomes a cathode and the electrode becomes an anode.

* * * * *